3,248,365
NON-CRYSTALLINE POLYCARBONATE PREPARED FROM α,α'-BIS(p-HYDROXYPHENYL)-p-XYLENE
Bryce C. Oxenrider, Florham Park, Thomas M. Cawthon, Rockaway, and Logan C. Bostian, Morris Township, Morris County, N.J., assignors to Allied Chemical Corporation, New York, N.Y., a corporation of New York
No Drawing. Filed Dec. 28, 1961, Ser. No. 162,932
1 Claim. (Cl. 260—47)

This invention relates to a new and useful polycarbonate and to a process for its preparation.

The polycarbonate of this invention, a non-crystalline material, is composed of recurring units of the formula:

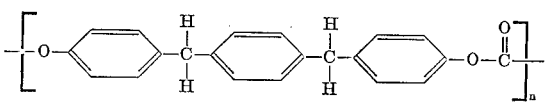

wherein $n$ is an integer from 1 to 500. This polycarbonate may be prepared by reacting α,α'-bis(p-hydroxyphenyl)-p-xylene with phosgene in a basic medium.

Polycarbonates prepared from compounds closely related to α,α'-bis(p-hydroxyphenyl)-p-xylene generally exhibit a substantial degree of crystallinity. Thus, it was quite surprising that a non-crystalline polycarbonate was obtained from α,α'-bis(p-hydroxyphenyl)-p-xylene. This polycarbonate may be employed in areas where highly crystalline materials are ineffective or inapplicable. For example, it is known that highly crystalline polycarbonates usually exhibit poor adhesive properties, necessitating the use of organic oxidizing agents such as benzoyl peroxide and/or baking processes in order to produce polycarbonates of improved adhesive and bonding strength. Such procedures are both costly and time-consuming. In contrast, the non-crystalline polycarbonate prepared from α,α'-bis(p-hydroxyphenyl)-p-xylene possesses outstanding inherent adhesive and bonding properties without the use of oxidizing agents or the implementation of baking procedures.

The polycarbonate of this invention may be prepared by solution polymerization wherein α,α'-bis(p-hydroxyphenyl)-p-xylene is reacted with phosgene in a substantially anhydrous basic medium in the presence of an inert organic solvent for the polycarbonate formed. Alternatively, the polycarbonate may be prepared by dispersion polymerization wherein α,α'-bis(p-hydroxyphenyl)-p-xylene is reacted with phosgene in an aqueous basic medium in the presence of an inert organic solvent for the polycarbonate formed.

The ratio of phosgene to α,α'-bis(p-hydroxyphenyl)-p-xylene is not critical. At least 0.1 mol of phosgene is generally employed per mol of α,α'-bis(p-hydroxyphenyl)-p-xylene. Theoretically, an equimolar amount of phosgene to α,α'-bis(p-hydroxyphenyl)-p-xylene is required for complete conversion to polycarbonate; however, to compensate for loss of phosgene by side reactions slightly more than 1 mol of phosgene per mol of α,α'-bis(p-hydroxyphenyl)-p-xylene is normally used. Accordingly, it has been found that the preferred ratio of phosgene to α,α'-bis(p-hydroxyphenyl)-p-xylene is from about 1.1 to 1.5 mols of phosgene per mol of α,α'-bis(p-hydroxyphenyl)-p-xylene. If less than 1 mol of phosgene is employed, correspondingly less of the α,α'-bis(p-hydroxyphenyl)-p-xylene will be converted to polycarbonate. If more than the preferred amount of phosgene is used, the operation tends to become uneconomical.

In solution polymerization, the substantially anhydrous basic medium is preferably a tertiary amine, such as pyridine, but may also be tributylamine, triethylamine, α-picoline, etc. In dispersion polymerization, the aqueous alkaline medium comprises an aqueous solution of an alkali metal compound such as sodium, potassium or lithium hydroxide. A slight excess of the basic material is preferably employed in either case.

The polycarbonate should be soluble in the organic solvent which is employed, and the solvent should be substantially inert under the conditions of the reaction, immiscible in water and have a sufficiently high boiling point to allow for reaction at elevated temperatures, if desired. The amount of solvent is not critical but from 1 to 20 parts by weight of solvent based on the polycarbonate formed are generally used. Typical solvents which may be employed include ethylene chloride and methylene chloride.

If no organic solvent is employed in the process, only low molecular weight polycarbonate is produced which precipitates from solution substantially as it is formed.

The phosgene is preferably slowly introduced into the basic solution, with the preferred time of addition being from about 15 minutes to about 4 hours. The temperature of the reaction may vary within a wide range, that is, it may be carried out at room temperature or lower or higher temperatures, as desired. Generally temperatures ranging from about 0° to 100° C. are utilized.

The phosgenation ordinarily produces a polycarbonate of low molecular weight. This polycarbonate can be converted into a polycarbonate of high molecular weight by a post-phosgenation growth period involving prolonged heating and stirring.

In the dispersion polymerization system, rapid growth to high molecular weight polycarbonate is realized by introducing a suitable catalyst. The catalyst may comprise a quaternary ammonium compound such as benzyltriethylammonium chloride, or a quaternary phosphonium or arsonium compound such as tetrabutylphosphonium bromide or tetraphenylarsonium iodide.

The addition of the above-described catalysts may be made prior to phosgenation of the reaction mixture, or if desired, phosgenation may be performed first, and upon complete reaction, the catalyst may then be added. The catalyst is preferably employed in amount from about 0.001 to 5.0 percent by weight based on the α,α'-bis(p-hydroxyphenyl)-p-xylene.

The polycarbonate may be recovered from solution by conventional means such as evaporation or distillation of the solvent or precipitating the polycarbonate by the addition of a non-solvent such as methanol, isopropanol, heptane, isooctane, etc. Of course, in the dispersion polymerization system, the solvent phase is separated prior to recovery of the polycarbonate.

Conventional chain terminators may be employed in order to control molecular weight. Typical examples of the terminators are phenol, tertiary butyl phenol, chlorophenol, nonyl alcohol, butyl alcohol, etc. Discontinuance of molecular growth is more effectively accomplished when the chain terminator is introduced during the post-phosgenation period. This enables obtainment of a polycarbonate of reproducible molecular weight.

Various additives may be employed, such as antioxidants, additives to prevent the decomposition of phosgene and additives to preferentially react with phosgene decomposition products. Typical of such additives are sodium dithionite, potassium bisulfite, carbon monoxide, etc.

It has been found that if the reaction proceeds under atmospheric conditions using either solution or dispersion procedures, some oxidation of the α,α'-bis(p-hydroxyphenyl)-p-xylene may occur which results in lowered yield and excessive discoloration of the polycarbonate. In order to minimize or completely eliminate these negative factors, the reaction should be carried out under an inert atmosphere which may be readily provided by blanketing the reaction system with an inert gas such as nitrogen, argon, carbon monoxide, etc.

The polycarbonate obtained in the present invention is a non-crystalline material having a glass transition temperature in the order of 74° to 85° C. The polycarbonate is soluble in conventional organic solvents such as ethylene chloride, methylene chloride, dioxane, tetrachloroethane, etc. Films may be cast from solutions of the polycarbonate in the solvents to form without baking hard, tough, flexible and adhesive coatings for metals such as steel.

The following examples are given for the purpose of illustrating the present invention. In the examples, parts are by weight.

*Example 1*

A solution was prepared by dissolving 29 parts of α,α'-bis(p-hydroxyphenyl)-p-xylene in 500 parts of ethylene chloride and 19.8 parts of pyridine. An inert atmosphere was provided by maintaining a slow stream of nitrogen over the reaction system. Phosgene was bubbled into the solution at the rate of 0.5 part per minute for a period of 20 to 25 minutes, while controlling the reaction temperature at 40° C. The total amount of phosgene introduced amounted to 12.4 parts. The reaction solution was washed free of pyridine and pyridine hydrochloride with dilute hydrochloric acid and water. 1250 parts of methanol were then added to the solution to precipitate polycarbonate in non-crystalline form. After removal by filtration, the polycarbonate was dried in a vacuum oven overnight at 60° C. The final product had an inherent viscosity of 0.29 (corresponding to a molecular weight of about 15,000).

*Example 2*

A solution was prepared with 37.7 parts of α,α'-bis-(p-hydroxyphenyl)-p-xylene, 16 parts of sodium hydroxide, 260 parts of water and 0.044 part of tetrabutylphosphonium bromide, while maintaining a nitrogen atmosphere over the reaction system. 325 parts of ethylene chloride were added to the solution, and the mixture was stirred rapidly to disperse the two phases, while maintaining the temperature at 40° C. or less. 13.8 parts of phosgene were then introduced with a slow nitrogen bleed over a 90 minute period at 40° C. The organic phase was removed, diluted with an equal volume of ethylene chloride and washed with dilute hydrochloric acid and then with water to a pH of 6. Non-crystalline polycarbonate having an inherent viscosity of 0.6 (corresponding to a molecular weight of about 30,000) was recovered by evaporating the solution.

The glass transition temperature of the polycarbonate of Example 2 was obtained by inducing a strain into a 1 mil thick film of the polycarbonate (cast from ethylene chloride) by stretching and noting the temperature at which the stress birefringence disappeared when observed between crossed polarizers on a hot-stage microscope. A glass transition temperature of 74–85° C. was observed.

The polycarbonate of Example 2 was evaluated as a coating on bonderized steel. A 0.5 mil thick film was cast from a 15 percent solution of the polycarbonate in methylene chloride. It was not baked. No failures occurred in the tape adhesion test, the mandrel test (elongation) and at 28 inch pounds in the impact test. The Sward rocker hardness was 60 (glass substrate).

A description of the above tests may be found in "Physical and Chemical Examination: Paints, Varnishes, Lacquers, Colors," 11th ed., 1950.

The present invention may be embodied in other forms or carried out in other ways without departing from the spirit thereof. The present embodiment is, therefore, to be considered illustrative and not restrictive, the scope of the invention being indicated by the appended claim.

We claim:

A non-crystalline polycarbonate composed of recurring units of the formula:

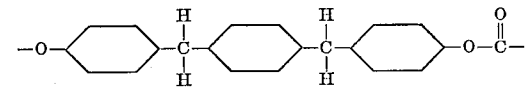

having a glass transition temperature of 74° to 85° C. and an average molecular weight of from about 15,000 to about 30,000.

References Cited by the Examiner

UNITED STATES PATENTS

| | | | |
|---|---|---|---|
| 2,321,627 | 6/1943 | Rothrock | 269—619 |
| 2,964,794 | 12/1960 | Peilstocker et al. | 260—47 X |
| 2,986,550 | 5/1961 | Davis et al. | 260—619 |
| 3,094,508 | 6/1963 | Butterworth | 260—47 X |

WILLIAM H. SHORT, *Primary Examiner.*

LOUISE P. QUAST, *Examiner.*